(12) United States Patent
Toal

(10) Patent No.: US 10,803,080 B2
(45) Date of Patent: *Oct. 13, 2020

(54) THREAD RECORD PROVIDER

(71) Applicant: salesforce.com, inc., San Francisco, CA (US)

(72) Inventor: Brian Toal, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 570 days.

This patent is subject to a terminal disclaimer.

(21) Appl. No.: 15/465,420

(22) Filed: Mar. 21, 2017

(65) Prior Publication Data

US 2018/0276285 A1    Sep. 27, 2018

(51) Int. Cl.
| | |
|---|---|
| *G06F 16/00* | (2019.01) |
| *G06F 16/25* | (2019.01) |
| *G06F 16/21* | (2019.01) |
| *G06F 11/30* | (2006.01) |

(52) U.S. Cl.
CPC ............ *G06F 16/252* (2019.01); *G06F 11/30* (2013.01); *G06F 16/217* (2019.01)

(58) Field of Classification Search
CPC .. G06F 16/273; G06F 16/2358; G06F 16/219; G06F 16/2365; G06F 16/1734; G06F 16/275; G06F 16/27; G06F 16/00; G06F 16/2379; G06F 16/1815; G06F 16/1865; G06F 16/217; G06F 16/252; G06F 11/30; G06F 11/3466; G06F 11/3476; G06F 16/1748; G06F 16/258; G06F 16/282; G06F 16/9535; G06F 2201/81; G06F 2201/865

USPC .................................................. 707/600–899
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,764,912 A * | 6/1998 | Rosborough | ....... G06F 11/3419 709/224 |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |

(Continued)

*Primary Examiner* — Michelle N Owyang
(74) *Attorney, Agent, or Firm* — Schwabe Williamson & Wyatt

(57) ABSTRACT

In an example, a computing system may include a thread record provider. In some examples, the computing system may incrementally change a first data structure as threads are established and completed, wherein the first data structure comprises first information of currently active threads; incrementally change a second different data structure responsive to a portion of changes of the first data structure, wherein the second data structure correlates second information that is different than the first information to the currently active threads; and synchronously extract content from the first and second data structures for a selected thread at a selected instant and concatenate the extracted content to form a record for the selected thread.

20 Claims, 7 Drawing Sheets

(56) References Cited

U.S. PATENT DOCUMENTS

| | | | |
|---|---|---|---|
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,133 | B1 | 4/2001 | Masthoff |
| 6,216,135 | B1 | 4/2001 | Brodersen et al. |
| 6,233,617 | B1 | 5/2001 | Rothwein et al. |
| 6,236,978 | B1 | 5/2001 | Tuzhilin |
| 6,266,669 | B1 | 7/2001 | Brodersen et al. |
| 6,288,717 | B1 | 9/2001 | Dunkle |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |
| D454,139 | S | 3/2002 | Feldcamp et al. |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,411,949 | B1 | 6/2002 | Schaffer |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec et al. |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 6,907,566 | B1 | 6/2005 | McElfresh et al. |
| 7,062,502 | B1 | 6/2006 | Kesler |
| 7,069,231 | B1 | 6/2006 | Cinarkaya |
| 7,069,497 | B1 | 6/2006 | Desai |
| 7,100,111 | B2 | 8/2006 | McElfresh et al. |
| 7,181,758 | B1 | 2/2007 | Chan |
| 7,269,590 | B2 | 9/2007 | Hull et al. |
| 7,289,976 | B2 | 10/2007 | Kihneman et al. |
| 7,340,411 | B2 | 3/2008 | Cook |
| 7,356,482 | B2 | 4/2008 | Frankland et al. |
| 7,373,599 | B2 | 5/2008 | McElfresh et al. |
| 7,401,094 | B1 | 7/2008 | Kesler |
| 7,406,501 | B2 | 7/2008 | Szeto et al. |
| 7,412,455 | B2 | 8/2008 | Dillon |
| 7,454,509 | B2 | 11/2008 | Boulter et al. |
| 7,508,789 | B2 | 3/2009 | Chan |
| 7,599,935 | B2 | 10/2009 | La Rotonda et al. |
| 7,603,331 | B2 | 10/2009 | Tuzhilin et al. |
| 7,603,483 | B2 | 10/2009 | Psounis et al. |
| 7,620,655 | B2 | 11/2009 | Larsson et al. |
| 7,644,122 | B2 | 1/2010 | Weyer et al. |
| 7,668,861 | B2 | 2/2010 | Steven |
| 7,698,160 | B2 | 4/2010 | Beaven et al. |
| 7,730,478 | B2 | 6/2010 | Weissman |
| 7,747,648 | B1 | 6/2010 | Kraft et al. |
| 7,779,039 | B2 | 8/2010 | Weissman et al. |
| 7,779,475 | B2 | 8/2010 | Jakobson et al. |
| 7,827,208 | B2 | 11/2010 | Bosworth et al. |
| 7,853,881 | B1 | 12/2010 | Aly Assal et al. |
| 7,945,653 | B2 | 5/2011 | Zukerberg et al. |
| 8,005,896 | B2 | 8/2011 | Cheah |
| 8,014,943 | B2 | 9/2011 | Jakobson |
| 8,015,495 | B2 | 9/2011 | Achacoso et al. |
| 8,032,297 | B2 | 10/2011 | Jakobson |
| 8,073,850 | B1 | 12/2011 | Hubbard et al. |
| 8,082,301 | B2 | 12/2011 | Ahlgren et al. |
| 8,095,413 | B1 | 1/2012 | Beaven |
| 8,095,531 | B2 | 1/2012 | Weissman et al. |
| 8,095,594 | B2 | 1/2012 | Beaven et al. |
| 8,103,611 | B2 | 1/2012 | Tuzhilin et al. |
| 8,150,913 | B2 | 4/2012 | Cheah |
| 8,209,308 | B2 | 6/2012 | Rueben et al. |
| 8,209,333 | B2 | 6/2012 | Hubbard et al. |
| 8,275,836 | B2 | 9/2012 | Beaven et al. |
| 8,457,545 | B2 | 6/2013 | Chan |
| 8,484,111 | B2 | 7/2013 | Frankland et al. |
| 8,490,025 | B2 | 7/2013 | Jakobson et al. |
| 8,504,945 | B2 | 8/2013 | Jakobson et al. |
| 8,510,045 | B2 | 8/2013 | Rueben et al. |
| 8,510,664 | B2 | 8/2013 | Rueben et al. |
| 8,566,301 | B2 | 10/2013 | Rueben et al. |
| 8,646,103 | B2 | 2/2014 | Jakobson et al. |
| 8,656,367 | B1 | 2/2014 | Sharma |
| 10,042,879 | B1 * | 8/2018 | Nikitina ............... G06N 20/00 |
| 10,467,117 | B2 * | 11/2019 | Wilding ............ G06F 11/3075 |
| 2001/0044791 | A1 | 11/2001 | Richter et al. |
| 2002/0072951 | A1 | 6/2002 | Lee et al. |
| 2002/0082892 | A1 | 6/2002 | Raffel et al. |
| 2002/0129352 | A1 | 9/2002 | Brodersen et al. |
| 2002/0140731 | A1 | 10/2002 | Subramaniam et al. |
| 2002/0143997 | A1 | 10/2002 | Huang et al. |
| 2002/0162090 | A1 | 10/2002 | Parnell et al. |
| 2002/0165742 | A1 | 11/2002 | Robbins |
| 2003/0004971 | A1 | 1/2003 | Gong |
| 2003/0018705 | A1 | 1/2003 | Chen et al. |
| 2003/0018830 | A1 | 1/2003 | Chen et al. |
| 2003/0066031 | A1 | 4/2003 | Laane et al. |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec et al. |
| 2003/0189600 | A1 | 10/2003 | Gune et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2004/0001092 | A1 | 1/2004 | Rothwein et al. |
| 2004/0010489 | A1 | 1/2004 | Rio et al. |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan et al. |
| 2004/0199489 | A1 | 10/2004 | Barnes-Leon et al. |
| 2004/0199536 | A1 | 10/2004 | Barnes-Leon et al. |
| 2004/0199543 | A1 | 10/2004 | Braud et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |

(56) References Cited

U.S. PATENT DOCUMENTS

| | | | |
|---|---|---|---|
| 2005/0091098 A1 | 4/2005 | Brodersen et al. | |
| 2007/0100916 A1* | 5/2007 | Konecny | G06F 9/5016 |
| 2008/0249972 A1 | 10/2008 | Dillon | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2009/0249348 A1* | 10/2009 | Xu | H04L 51/16 |
| | | | 718/102 |
| 2010/0162247 A1* | 6/2010 | Welc | G06F 9/466 |
| | | | 718/101 |
| 2011/0041006 A1* | 2/2011 | Fowler | G06F 9/5072 |
| | | | 714/10 |
| 2011/0218958 A1 | 9/2011 | Warshavsky | |
| 2011/0246993 A1* | 10/2011 | Moir | G06F 9/467 |
| | | | 718/101 |
| 2011/0247051 A1 | 10/2011 | Bulumulla | |
| 2012/0042218 A1 | 2/2012 | Cinarkaya | |
| 2012/0233137 A1 | 9/2012 | Jakobson et al. | |
| 2012/0290407 A1 | 11/2012 | Hubbard et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya | |
| 2014/0059017 A1* | 2/2014 | Chaney | G06F 16/25 |
| | | | 707/692 |
| 2014/0310235 A1* | 10/2014 | Chan | G06F 11/3003 |
| | | | 707/603 |
| 2014/0359537 A1 | 12/2014 | Jackobson et al. | |
| 2015/0302026 A1* | 10/2015 | Nam | G06F 16/119 |
| | | | 707/827 |
| 2016/0335009 A1* | 11/2016 | Vijayan | G06F 3/065 |

\* cited by examiner

THREAD RECORD PROVIDER

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to computing systems, and some embodiments relate to a thread record provider.

DESCRIPTION OF THE RELATED ART

Sample based profiling, e.g., memory allocation profiling, runtime profiling, or the like, or combinations thereof, may include capturing a call stack from a running thread. For example, Java runtime provides an API (application programming interface) that may provide information including the call stack for all running threads. Depending on characteristics of the computing system (e.g., in a multitenant application) and/or as the number of running threads scales, the value (e.g., diagnostic value) of the information that can be provided from this API may be limited. For instance, in a multi-tenant computing system and/or a system with significant number of threads that is exhibiting poor performance (e.g., increased query latency), pinpointing an underlying cause of the poor performance based on the information provided from this API (or even narrowing down the poor performance to a tenant, user, software update, or the like) may be difficult and/or require processes that may be disruptive to users.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
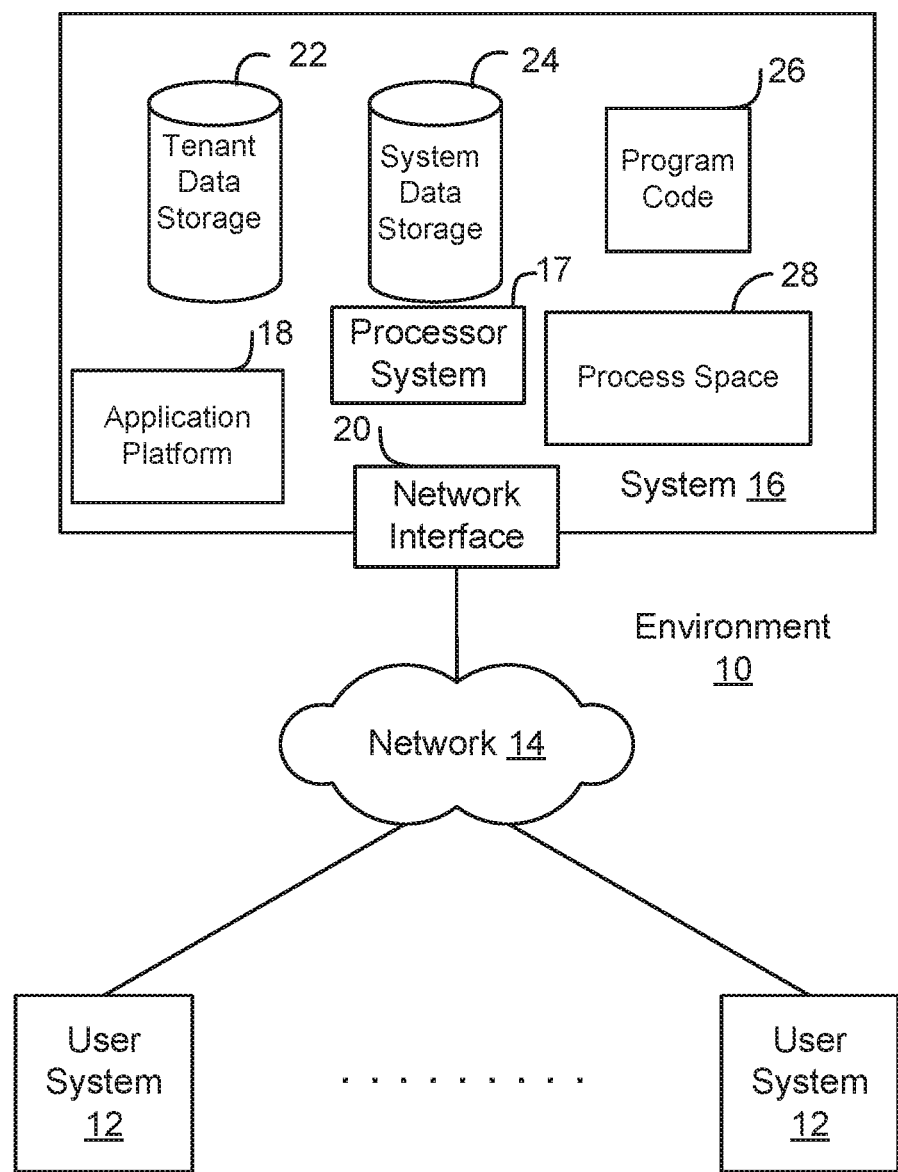
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for a thread record provider.

Some computing systems (e.g., database systems) may utilize Java runtime, which may provide information including a call stack for all running threads. However, in a multi-tenant application, a performance problem (e.g., a spike in latency) may be induced by any number of operational characteristics such as the way a tenant is using the system, a particular feature of an application of the computing system, whether or not a thread is holding onto a resource connection (e.g., a database connection), etc. The information provided by the Java runtime API (e.g., the call stack, thread identifiers, thread state, or the like) may not be enough to correlate a subset of these operational characteristics to the performance problem in at least some computing systems (such as those computing systems running an application with a large number of running threads). For instance in a multi-tenant computing system, the output information may include call stacks for, say, a hundred threads for an hour across many application servers (say thirty) related to multiple tenants. Without additional data besides the information that may be output from the Java runtime API, the output information may not be able to be filtered by a custom criterion (such as tenant, user, feature identifier, or the like, or combinations thereof).

In some examples, a computing system may include a thread record provider. In a Java runtime system having an API to output intrinsic information for a thread (such as a thread identifier and/or a thread state), the thread record provider may include a separate API or other component to provide additional information (e.g., extend the intrinsic data to include arbitrarily defined metadata). In contrast to the Java runtime API which may only output limited information such as call stacks, the separate API or other component may provide a sample record that includes the call stack and additional information (e.g., custom information). The additional information may allow filtering and/or aggregation of record data based on a criterion (such as tenant). Using filtering and/or aggregation by a user or tenant in a computing system associated with a multi-tenant application may reveal which records of, say, hundreds of threads for an hour across many application servers (say thirty) relate to a selected tenant.

In some examples, a sample agent may execute registered callbacks to inject the additional information (e.g., arbitrary metadata) into a data structure (e.g., a map). Responsive to a selection of a thread, the callback can perform a lookup on the data structure to identify metadata corresponding to the running thread. When a thread is handling application logic, as selected contexts (e.g., arbitrary contexts) become active, those contexts can be associated with the data structure (e.g., a map such as a global map) that may be keyed based on a portion of the thread information (e.g., the intrinsic information). Callbacks that may be iterated through when the sampling agent samples a thread may lookup associated additional information. The additional information may indicate how the application behaves in association with the selected context.

In some examples, a computing system (e.g., an application of a computing system such as a database system) may provide a sample record that may include metadata such as distributed values, distributed tracing identifiers, tenant identifiers, user identifiers, session identifiers, a value to indicate when the request is hanging onto a resource (e.g., a database connection, an HTTP connection, etc.), metadata corresponding to an active RPC callout (e.g., output HTTP request URL, query parameters/headers, query identifiers, etc.), or the like, or combinations thereof. The contextual value of such a sample may be greater than a sample based only on the intrinsic information provided by the Java runtime API. In some examples this record may provide useful analytics for at least the reason that the injected metadata may be used to filter and/or aggregate samples to gain insight into runtime behavior of the application, which may be useful for troubleshooting problems or other reasons.

In some examples, a computing system includes a client (e.g., a profiler agent) to obtain a thread context mapper implementation. The client may acquire an instance of a thread record provider. The client may acquire a thread record from the thread record provider, by using the instance of the thread context mapper implementation. The thread record provider may obtain a snapshot of all threads non-custom information (e.g., thread identifier, thread name, thread state, etc.) The context mapper may perform a lookup by thread identifier to a data structure including custom information to fetch custom metadata for the thread. The custom thread metadata may be joined with the non-custom metadata to form a record.

In an example, a client (e.g., a profiler agent) may call a getAll command, and supply an application specific context as a callback of one registered custom context mapper of a library of registered custom context mappers. The thread record provider may obtain all Thread Infos from a Java Virtual Machine (JVM) API and enumerate through the Thread Infos. The thread record provider may call into the custom context mapper using a selected portion of the Thread Infos (e.g., a selected thread identifier value). The custom context mapper may use the selected portion of the Thread Infos as a key to join the selected portion to a portion of a data structure including custom metadata (the data structure may be written by a thread tracker and read by the custom context mapper, in some examples). The computing system may provide the record based on the join.

A computing system may identify times (such as randomly, periodically, at scheduled intervals, or the like, or combinations thereof) for a thread record provider to form, respectively, custom metadata records for selected thread(s) to provide a set of custom metadata records. In some examples, the set of custom metadata records may be persisted to a single global data store. Portions of each sample record, such as call stack, may be de-duplicated to reduce the aggregated storage size. Since all samples across all applications or instances of the application may be in one data store, opportunities across the entire site may be realized. Trend analysis may be performed on historic data, enabling regressions in features across applications to be identified. Regression analysis logic may be scheduled to run at times (e.g., periodically) so that regression day over day, week over week, release over release can be identified (e.g., automatically identified). The computing system may identify the top resource consuming application service/feature across the site.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
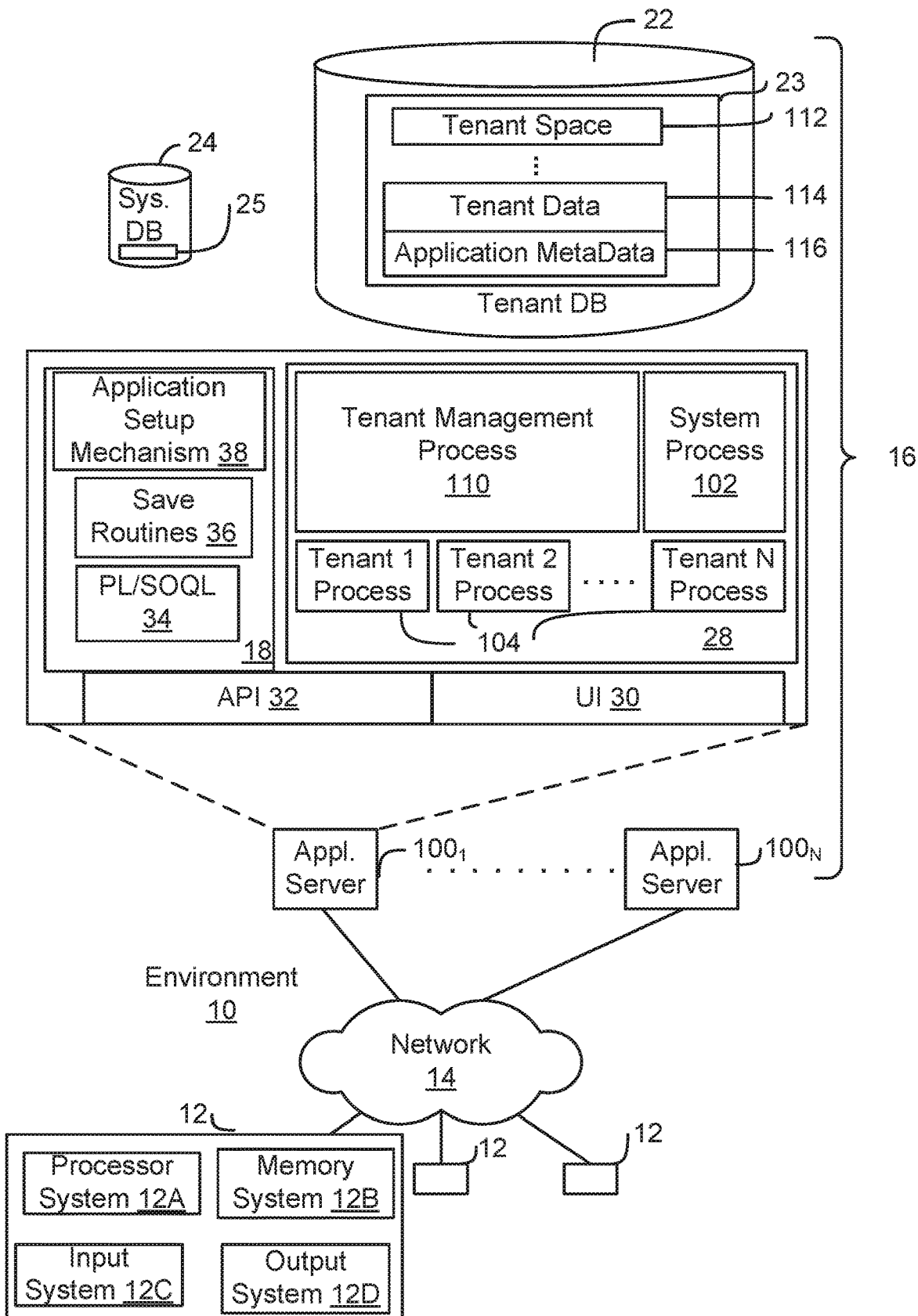
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Thread Record Provider

Figure 2:
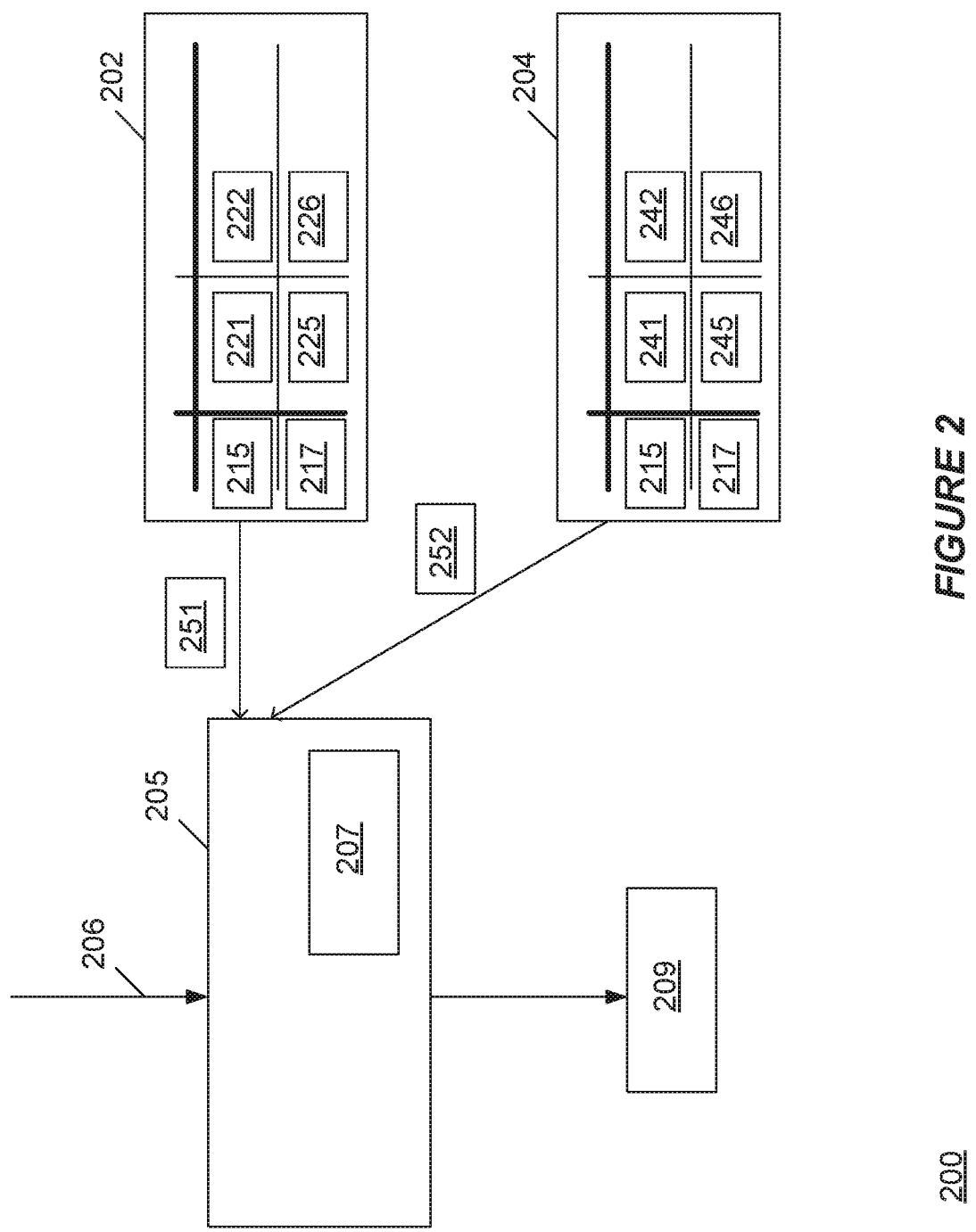
FIG. 2 illustrates a computing system including a thread record provider.

FIG. 2 illustrates a computing system 200 including a thread record provider 205. The computing system 200 may include a data structure 202 (e.g., a map) to track information (e.g., core information such as thread identity, thread status, etc.) of currently activate threads. The computing system 200 may include a data structure 204 to track additional information (e.g., custom metadata) of threads of the data structure 202. In some examples, the data structure 204 may be an additional map (e.g., a concurrent map). The thread record provider 205 may generate a record 209 for a thread based on joining portions 251 and 252 of the content of the data structures 202 and 204, respectively, in response to a request 206.

In some examples, the computing system 200 may be similar to any computing system described herein, for example any database system described with references to FIGS. 1A-B. The thread record provider 205 may be a component of any application server described with reference to FIGS. 1A-B, e.g., any of the application servers $100_{1-N}$ (FIG. 1B). The request 206 may be from an internal service or from any user system described with reference to FIGS. 1A-B (e.g., from an HTTP request from a browser of user system 12 of FIG. 1B). The thread record provider 205 may be implemented using circuitry, such as a general purpose processor (e.g., any number of general purpose processors for instance different physical processors of the computing system 200) to be transformed into a special purpose processor to perform any of operations described herein responsive to accessing instructions stored in an electronic memory.

In some implementations, the thread record provider 205 may be extendible so that the custom information to be associated with currently running threads can be changed. In such implementations, the thread record provider 205 may be any number of thread context mapper implementations each corresponding to different custom information. Each context mapper implementation may include the logic (e.g., join logic) to identify the portion of the data structure 204 to join with the content of the data structure 202. For example, the thread record provider 205 may utilize a first context mapper implementation of a library to associate first application specific metadata to a thread for a first record, and but may utilize a different context mapper implementations of a library to associate second application specific metadata that is different than the first application specific metadata to a thread for a second record.

The data structures 202 and 204 may be maps, each indexed by thread identifier, e.g., two thread identifiers 215 and 217 are shown in each of the data structures 202 and 204 in the illustration. The data structure 202 may be constantly mutated as threads are established or unestablished (completed), e.g., a count of the rows of the data structure 202 may change at every time of thread creation or completion. The data structure 202 may track values 221 (e.g., thread name) and 222 (e.g., thread state) for thread identifier 215, and values 225 (e.g., thread name) and 226 (e.g., thread state) for thread identifier 217. The information of each row of data structure 202 may be referred to as Thread Infos in Java runtime implementations.

Data structure 204 may be concurrent with data structure 202, e.g., the computing system 200 may constantly mutate the data structure 204 responsive to a portion of the mutations of the data structure 202 based on an application specific context 207. The application specific context 207 may be specified using a thread context mapper implementation, in some examples. In examples in which data structure 204 is a map, the data structure 204 may be hash map. The record 209 may be a snapshot of content of the data structures 202 and 204 for a selected thread at a selected instant. Each entry in the data structure 204 may include at least one value of additional data (in the illustration two values 241 and 241 of additional data are shown for the entry for thread identifier value 215, and two values 245 and 246 are shown for the entry for thread identifier value 217, but this is not intended to be limiting). The portions of content 251 and 252 may include, for a selected one of the thread identifier values 215 and 217, corresponding ones of the values 221, 222, 225, 226, 241, 242, 245, and 246.

In some examples, the thread record provider 205 may run in a program such as a virtual machine, e.g., a JVM. In some virtual machine implementations, the thread snapshot provider 205 may run in the same virtual machine as a client (e.g., a profiler agent) and an application container. The thread snapshot provider 205 may obtain first information from the data structure 202 (e.g., "Thread Infos" such as thread identifier, thread status, etc.). In some examples, the thread snapshot provider may include a thread context mapper implementation to read a map generated by a thread tracker component of the application container. Each row of the map may include a value for thread identifier, a value for user name, and a value for tenant. The user name and the tenant may be identified from information of the request 206. The thread tracker may update/delete rows and/or values of the map based on changes to the Thread Infos.

Figure 3:
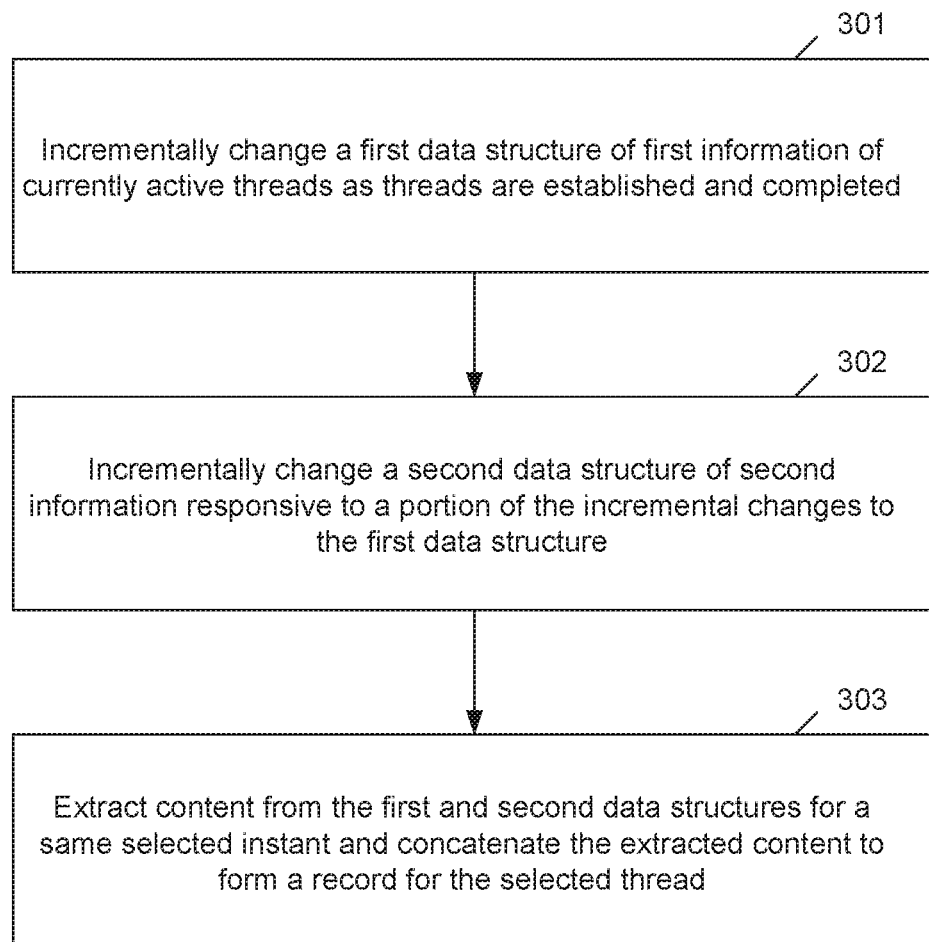
FIG. 3 illustrates a process that may be performed by the computing system of FIG. 2 to form a record, in some embodiments.

FIG. 3 illustrates a process 300 that may be performed by the computing system 200 of FIG. 2 to form a record, in some embodiments.

In block 301, the computing system 200 may incrementally change a first data structure of first information (e.g., intrinsic information) of currently active threads as threads are established and deleted. For example, the computing system 200 may add and remove entries from a map as threads are established and completed. In one example, a JVM of the computing system 200 may maintain the first data structure.

In block 302, the computing system 200 may incrementally change a second data structure of second different information (e.g., custom information) responsive to a portion of the incremental changes to the first data structure. In some examples, a thread tracker of a container of the JVM may maintain a map indexed by thread identifier and including name values and/or tenant values.

In block 303, the computing system 200 may extract content from the first and second data structures for a same selected instant and concatenate the extracted content to form a record for the selected thread. The computing system 200 may include in the record third information such as the call stack. The third information may include a time stamp to indicate a clock value at the selected instant and/or a time of record creation and/or a rank/position value.

Figure 4:
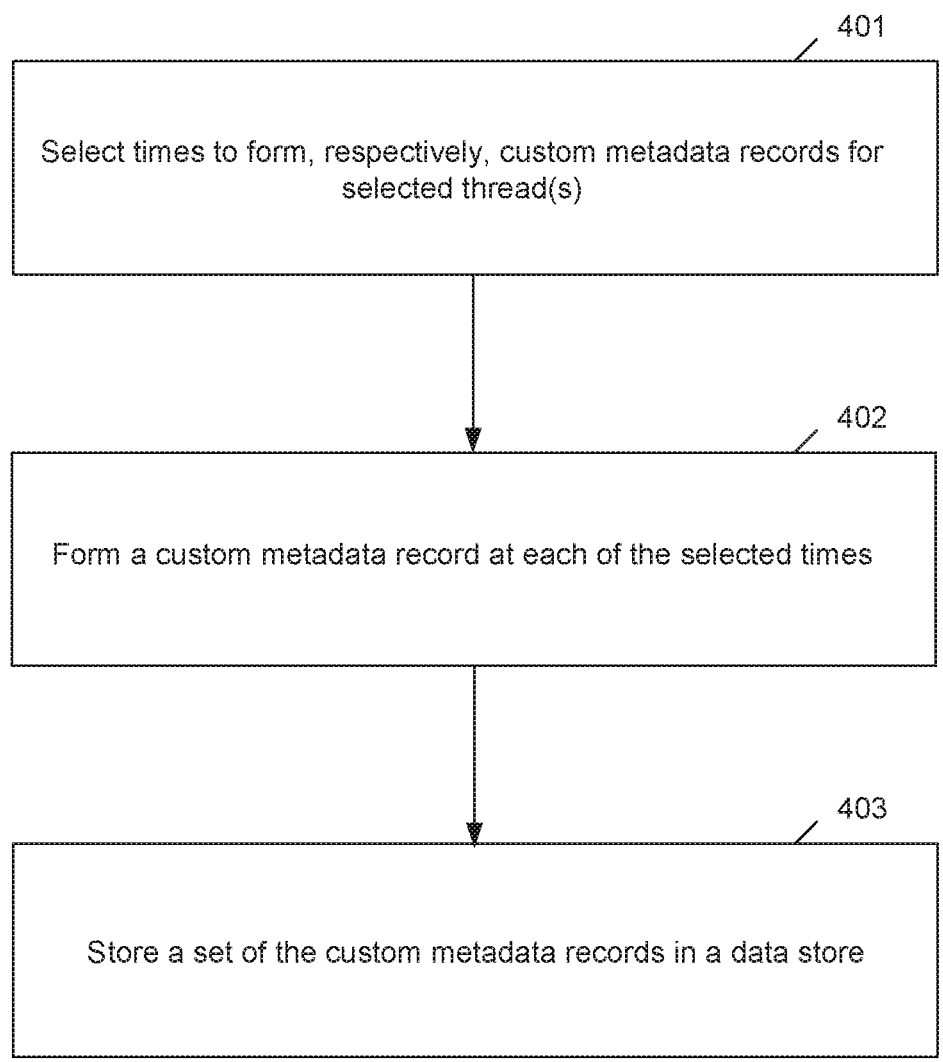
FIG. 4 illustrates a process that may be performed by the computing system of FIG. 2 to form a set of records, in some embodiments.

FIG. 4 illustrates a process 400 that may be performed by the computing system 200 of FIG. 2 to form a set of records, in some embodiments. In block 401, the computing system 200 may select times to form, respectively, custom metadata records for selected thread(s).

In some examples, durations of at least one of the intervals between the identified times may be variable (e.g., random) and/or non-periodic. An application being profiled may perform tasks at non-variable intervals and/or requests for a variety of reasons. With a variable duration (e.g., random) between the selected times for such an application, bias in the results due to coinciding or non-coinciding of periodic intervals may be reduced. In other examples, the selected times may be identified based on a fixed period and/or a predefined schedule.

In the case of profiling more than one application, each application may be profiled by a different agent (e.g., an agent running for each application of a portion of applications of the computing system 200). The different agents need not identify times the same way. For example, one agent may select times at a one second random interval, and another agent may select times at a fixed one second interval.

In block 402, the computing system 200 may form a custom metadata record at each of the selected times. Each custom metadata record may be formed using the process 300 (FIG. 3) or any other process of using a thread record provider described herein.

Figure 5:
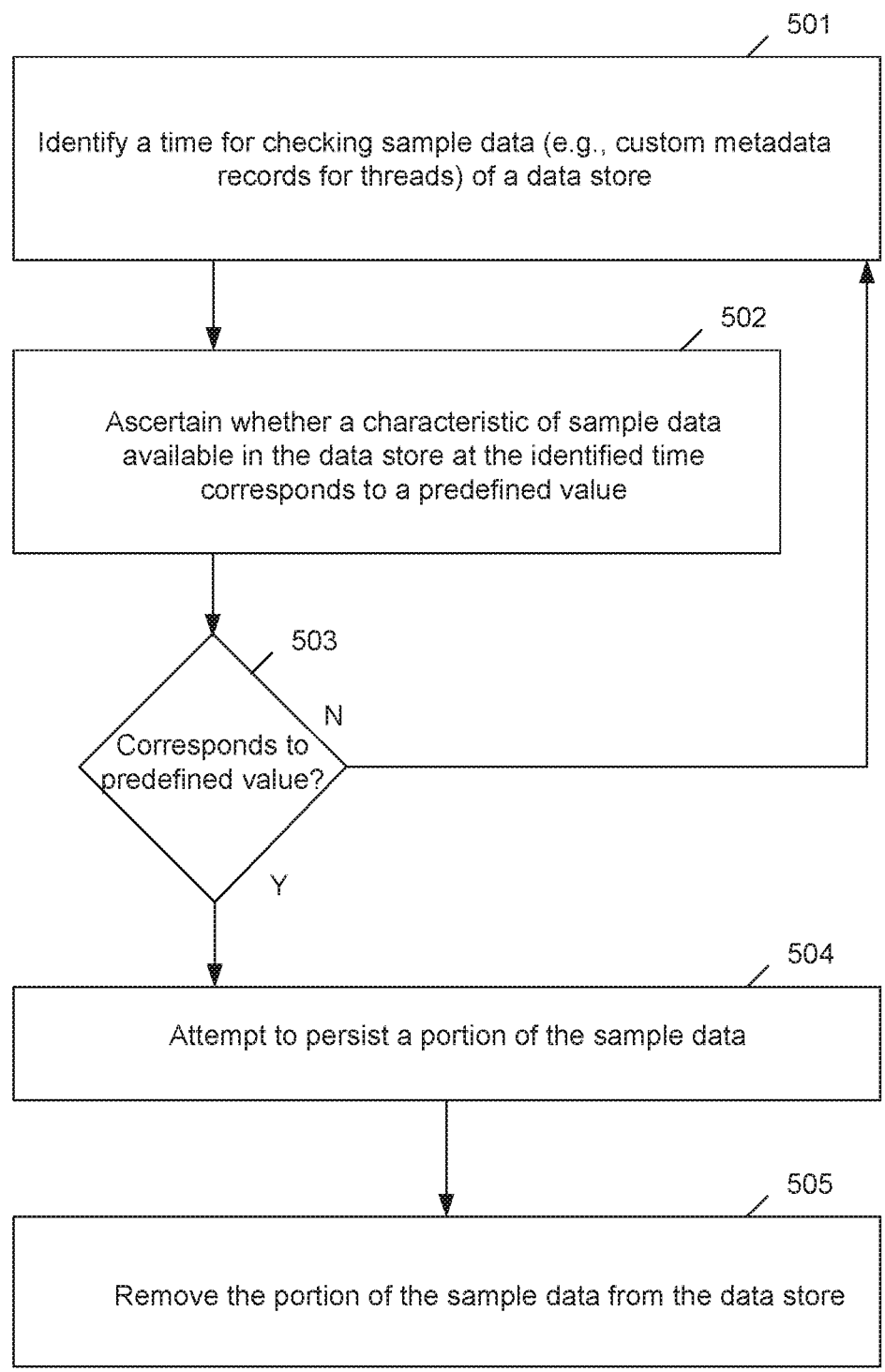
FIG. 5 illustrates a process that may be performed by the computing system of FIG. 2 to persist a portion of sample data of a set of records, in some embodiments.

In block 403, the computing system 200 may store a set of the custom metadata records in a data store. In some examples, this data store may reside in a same volatile memory used by the application being profiled, and a persist process may be used to at times persist portions of the content of the data store to a data store residing on a non-volatile memory (FIG. 5 will be described later). In other examples, it may be possible and practical for the data store of block 403 to reside on a non-volatile memory. In some examples, the data store may reside on the tenant database 22 (FIG. 1B), the system database 24 (FIG. 1B), or some other database such as a database of a remote database system.

Information such as the set of the custom metadata records and/or call stack (e.g., a run time stack) may be manually and/or automatically analyzed to, for example, probabilistically determine how an application is being used. This may be used to identify a cause of slowdowns in application performance. If a tenant identifies a slowdown, the information can be profiled for tenant based on values of the custom information that was concatenated with the intrinsic information.

FIG. 5 illustrates a process 500 that may be performed by the computing system 200 of FIG. 2 to persist a portion of sample data of a set of records, in some embodiments. The process 500 may be performed by a different agent than the agent(s) to form custom metadata records. In some examples, the agent for performing process 500 may operate only at certain times of day or in certain conditions such as when a count or total size of custom metadata records stored in a data store residing in main memory reaches a threshold.

In block 501, the computing system 200 may identify a time for checking sample data of a data store (e.g., custom metadata records for threads). In some examples, the data store may be the data store used in block 403 (FIG. 4). In some examples, the time may be identified according to a different interval than the interval(s) used in block 401 to select the times for forming the custom metadata records. In some examples, an interval used for identifying a time in block 501 may be a fixed interval (say once a minute), while an interval for forming custom metadata records may be on a non-fixed interval (say a one minute random interval).

In block 502, the computing system 200 may ascertain whether a characteristic of the sample data available in the data store at the identified time corresponds to a predefined value. For instance, the computing system 200 may ascertain whether the sample data is equal to at least a threshold size, includes a predefined count of records, and/or corresponds to a threshold time range (e.g., the difference between a time stamp of an oldest record and a time stamp of a youngest record is greater than a threshold duration, say one minute). If the characteristic of the available sample data does not correspond to the predefined value in diamond 503, then the process 500 may end or return to block 501 to check again (say one minute later).

If the characteristic of the available sample data does correspond to the predefined value in diamond 503, in block 504 the computing system 504 may attempt to persist a portion of the sample data. The portion may be a fixed count of records and/or a fixed amount of bits of data, which may not necessarily be the entire portion of available sample data. In some examples, the database 200 may attempt to persist the portion of the sample data to a different data store, e.g., a single global data store for all application servers of a group (e.g., application servers $100_1$-$100_N$). The global data store may be located in any database described herein. In some examples, block 504 may include attempting to persist the portion of the sample data over HTTP.

In some examples, in blocks 502-504 the computing system 200 may batch up custom metadata records and persist the batch. Batching may be by a predefined quantity of records and/or for a predefined time interval. For example, a batching process may initiate at the earlier of reaching a predefined count of records or based on a time count reaching a predefined threshold.

In block 505, the computing system 200 may remove the portion of the sample data from the data store. Block 505 may be based on a result of the attempt in some examples (e.g., the portion of the sample data may be removed only if the attempt to persist was successful). In some examples, the process 500 may end based on an unsuccessful attempt (the processor 500 may be repeated at a later time based on a persistence interval/schedule).

If a database for persisting a batch is not available, the data of the batch may remain in main memory. However, the computing system 200 may utilize a drop threshold for an upper bound for a total size and/or count of custom metadata records in main memory to avoid impacting the application which is being observed. In some examples, this threshold may be greater than a persist threshold used to determine to initiate (or change) a process for persisting data of custom metadata records. The persisting process may be initiated (or changed, say, to a more aggressive mode based on a more frequent interval) at a first persist threshold. In the event that a second greater drop threshold is reached (e.g., custom metadata records are not being persisted fast enough compared to formation of custom metadata records into main memory), samples may be dropped from memory to avoid impacting application performance.

In one example, in which new versions of an application are released every three months, persisted data may be stored for six months. After a software release, the computing system 200 the persisted data may be used to compare thread characteristics for records before and after the software release. For instance, custom metadata records for threads established a week after the software release went live could be compared to custom metadata records for the oldest three months of the persisted data.

Figure 6:
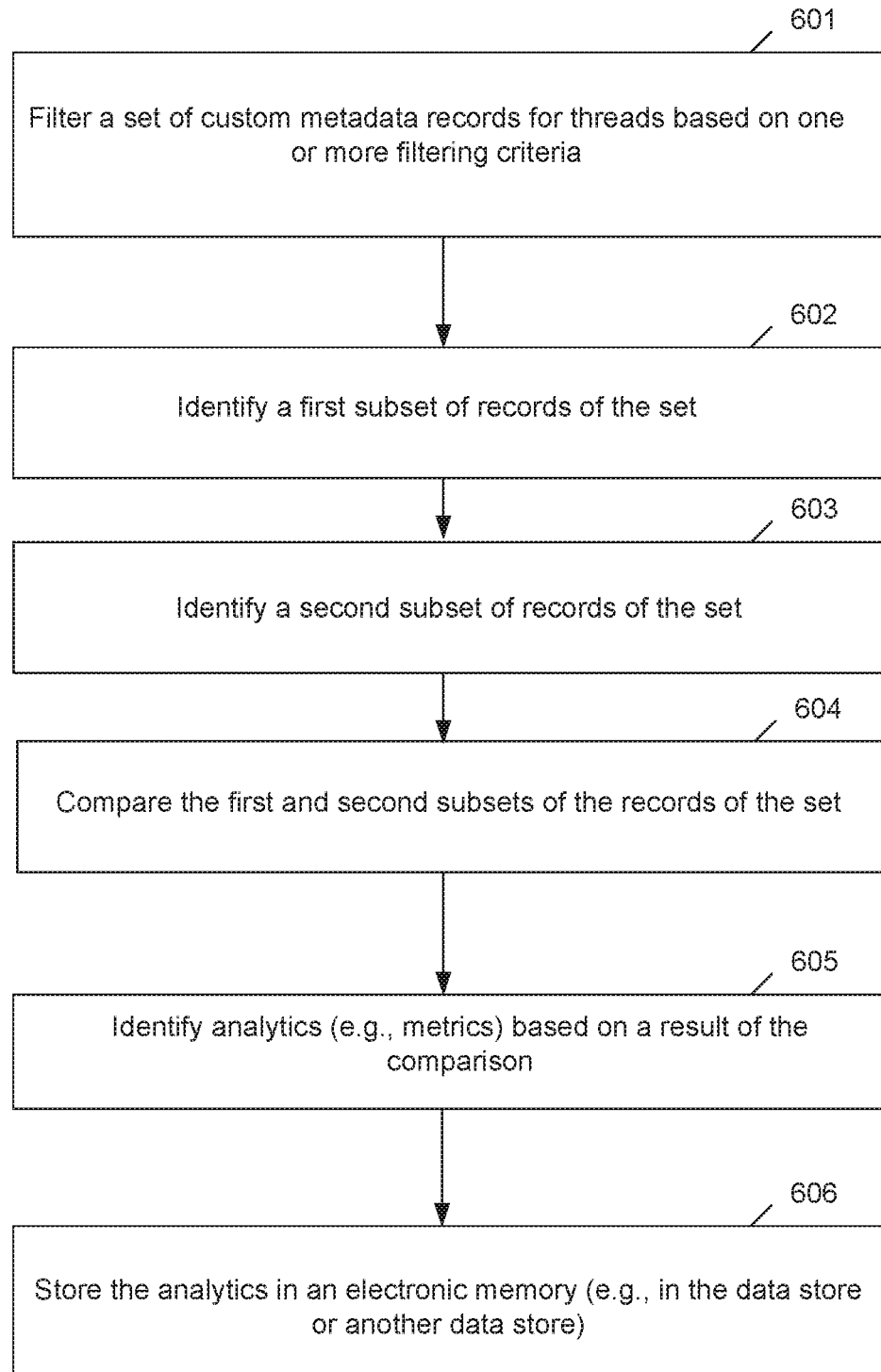
FIG. 6 illustrates a process that may be performed by the computing system of FIG. 2 to identify analytics for a set of records.

FIG. 6 illustrates a process 600 that may be performed by the computing system 200 of FIG. 2 to identify analytics for a set of records.

In block 601, the computing system 200 may filter a set of custom metadata records for threads based on one or more filtering criteria. The set of custom metadata records may be identified from main memory and/or a global data store to which sample data is persisted, in some examples. A filtering criterion of the criteria may correspond to the custom metadata of the records (e.g., the custom metadata may include user name values and/or tenant values, and the filtering criterion may be a selected user name value or tenant identifier value). A filtering criterion of the criteria may be a time range (e.g., may correspond to time stamps added to the records).

In block 602, the computing system 200 may identify a first subset of records of the set. The first subset may be a filtered portion of the set (e.g., sample data including sample records having a tenant and/or user name value corresponding to the selected user/tenant identifier value and/or for a selected time range).

In block 603, the computing system 200 may identify a second different subset of records of the set. In some examples, the second different subset may be a filtered portion of the set for using different filtering criteria (for example the different filtering criteria may be the same selected user name and/or tenant identifier value and a different selected time range). In other examples, the second different set may be identified using a different filtering criterion corresponding to the custom metadata. In yet other examples, the second different subset may be a portion of remainder of the set of records other than the first subset or records of a reference group (such as records formed in a reference time period).

In block 604, the computing system 200 may compare the first subset of records of the set and the second subset of the records of the set. For example, custom metadata records formed in one minute may be compared to custom metadata records formed in a next minute. A comparison may be based on one or more available comparison rules. Different comparison rules may correspond to different dimensions, e.g., tenant, feature, user, release, stacks, or the like, or combinations thereof.

In block 605, the computing system 200 may identify analytics based on a result of the comparison. The analytics may correspond to the set of records (e.g., metric data) and/or at least one of the subsets. The analytics may include a container of results from the one or more comparison rules.

In some examples, the analytics may specify a difference between the two subsets, for instance when each subset corresponds to a same tenant and/or user for a different time period). The difference may be between a first call stack(s) and second call stack(s). The first call stack(s) may be associated with records of one subset, and the second call stack(s) may be associated with records of the other subset. The difference may pinpoint a regression in code for the application, a change in the way the user and/or tenant is using the application, etc. The difference may be a frequency that new paths or existing paths have gone up or down in count. In some examples, the computing system 200 may rank the change paths. For instance, the most significant change paths may be ranked at the top of a ranking to be reviewed by the computing system 200 and/or a user. The ranking can be used to automatically surface regressions and/or determine the significance of the regressions for creating bug reports associated with a new release.

In block 606, the computing system 200 may store the analytics in an electronic memory. The analytics may be stored in any data store described herein, such as the global data store.

EXAMPLES

Example 1 is a computing system, comprising: a processing system; and a memory device coupled to the processing system and including instructions stored thereon that, in response to execution by the processing system, are operable to perform operations including: incrementally changing a first data structure as threads are established and completed, wherein the first data structure comprises first information of currently active threads; incrementally changing a second different data structure responsive to a portion of changes of the first data structure, wherein the second data structure correlates second information that is different than the first information to the currently active threads; and synchronously extracting content from the first and second data structures for a selected thread at a selected instant and concatenating the extracted content to form a record for the selected thread.

Example 2 includes the subject matter of example 1 (or any other example described herein), wherein the first information comprises a thread identifier value, a thread name value, and a thread state value.

Example 3 includes the subject matter of any of examples 1-2 (or any other example described herein), wherein the second information comprises thread context.

Example 4 includes the subject matter of any of examples 1-3 (or any other example described herein), wherein the second information comprises at least one of user name value or a tenant identifier value.

Example 5 includes the subject matter of any of examples 1-4 (or any other example described herein), wherein the first and second data structures comprise first and second maps, respectively, each map indexed by thread identifier.

Example 6 includes the subject matter of any of examples 1-5 (or any other example described herein), wherein the record includes third information.

Example 7 includes the subject matter of any of examples 1-6 (or any other example described herein), wherein the third information comprises a time stamp.

Example 8 includes the subject matter of any of examples 1-7 (or any other example described herein), wherein the third information comprises a call stack for the selected thread.

Example 9 includes the subject matter of any of examples 1-8 (or any other example described herein), wherein at least one of the threads is created responsive to a request received by the computing system.

Example 10 includes the subject matter of any of examples 1-9 (or any other example described herein), wherein the request comprises at least one of a request of an internal service of the computing system or a HTTP (hypertext transfer protocol) request of a browser of a client device.

Example 11 includes the subject matter of any of examples 1-10 (or any other example described herein), wherein the operations further comprise identifying an application specific context and extracting the content from the second data structure based on the application specific context.

Example 12 includes the subject matter of any of examples 1-11 (or any other example described herein), wherein identifying the application specific context further comprises selecting a thread context mapper of a plurality of thread context mappers.

Example 13 is a method, comprising: incrementally changing a first data structure as threads are established and completed by an application of a computing system, wherein the first data structure comprises first information of currently active threads; incrementally changing a second different data structure responsive to a portion of changes of the first data structure, wherein the second data structure correlates second information that is different than the first information to the currently active threads; and synchronously extracting content from the first and second data structures for a selected thread and concatenating the extracted content to form a record for the selected thread.

Example 14 includes the subject matter of example 13 (or any other example described herein), wherein the first information comprises a thread identifier value, a thread name value, and a thread state value.

Example 15 includes the subject matter of any of examples 13-14 (or any other example described herein), wherein the second information comprises thread context.

Example 16 includes the subject matter of any of examples 13-15 (or any other example described herein), wherein the first and second data structures comprise first and second maps, respectively, each map indexed by thread identifier.

Example 17 includes the subject matter of any of examples 13-16 (or any other example described herein), wherein the record includes third information.

Example 18 includes the subject matter of any of examples 13-17 (or any other example described herein), wherein the third information comprises a call stack for the selected thread.

Example 19 includes the subject matter of any of examples 13-18 (or any other example described herein), further comprising identifying an application specific context and extracting the content from the second data structure based on the application specific context.

Example 20 includes the subject matter of any of examples 13-19 (or any other example described herein), wherein identifying the application specific context further comprises selecting a thread context mapper of a plurality of thread context mappers.

Example 21 is a computing system, comprising: a processing system; and a memory device coupled to the processing system and including instructions stored thereon that, in response to execution by the processing system, are operable to perform operations including: incrementally changing a first data structure as threads are established and completed by an application of the computing system, wherein the first data structure comprises first information of currently active threads; incrementally changing a second different data structure responsive to a portion of changes of the first data structure, wherein the second data structure correlates second information that is different than the first information to the currently active threads; identifying a plurality of times; and at each selected time, synchronously extracting content from the first and second data structures for a selected thread and concatenating the extracted content to form a record for the selected thread.

Example 22 includes the subject matter of example 21 (or any other example described herein), wherein the operations further comprise: storing the records in a first data store; identifying a portion of content of the first data store; attempting to persist the portion of the content to a second data store that is different than the first data store; and removing the portion of the content from the first data store responsive to persisting the portion of the content to the second data store.

Example 23 includes the subject matter of any of examples 21-22 (or any other example described herein), wherein the first data store resides in a local resource, wherein the local resource comprises at least one of a non-persistent memory or a local persistent storage, and the second data store resides in at least one of a remote storage or a different local resource.

Example 24 includes the subject matter of any of examples 21-23 (or any other example described herein), wherein the operations further comprise: monitoring a size of the content of the first data store based on a drop threshold; and dropping at least one record from the first data store based on a result of the monitoring.

Example 25 includes the subject matter of any of examples 21-24 (or any other example described herein), wherein dropping the at least one record from the first data store comprises overwriting a least recently formed record of the first data store with a most recently formed record.

Example 26 includes the subject matter of any of examples 21-25 (or any other example described herein), wherein the operations further comprise: identifying the plurality of times based on a first interval; selecting a time based on a second interval that is different than the first interval; and wherein identifying of the portion of the content of the first data store is responsive to the selection of the time based on the second interval.

Example 27 includes the subject matter of any of examples 21-26 (or any other example described herein), wherein the first interval is variable and the second interval is non-variable.

Example 28 includes the subject matter of any of examples 21-27 (or any other example described herein), wherein the first interval comprises a random interval.

Example 29 includes the subject matter of any of examples 21-28 (or any other example described herein), wherein the second interval comprises a periodic interval.

Example 30 includes the subject matter of any of examples 21-29 (or any other example described herein), wherein the operations further comprise: determining whether a characteristic of the content of the first data store corresponds to a predefined value; and identifying the portion of the content of the first data store responsive to a result of the determination.

Example 31 includes the subject matter of any of examples 21-30 (or any other example described herein), wherein the characteristic comprises at least one of a record count of the content or a total size of the content.

Example 32 includes the subject matter of any of examples 21-31 (or any other example described herein), further comprising: determining whether a call stack corresponding to at least one of the concatenations corresponds to call stack of a stored record or a call stack of a different one of the concatenations; and responsive to a result of the determination, performing at least one of forming the record for said concatenation based on a result of the determination or modifying said record after formation to de-duplicate the call stack in a data store.

Example 33 includes the subject matter of any of examples 21-32 (or any other example described herein), further comprising: filtering the records based on one or more filtering criteria, wherein at least one criterion of the one or more filtering criteria corresponds to the second information; identifying a first subset of the records responsive to the filtering; and comparing the first subset of the records to a second different subset of the records based on one or more dimensions to identify a difference between the subsets.

Example 34 includes the subject matter of any of examples 21-33 (or any other example described herein), wherein another filtering criterion of the filtering criteria comprises a time range.

Example 35 includes the subject matter of any of examples 21-34 (or any other example described herein), wherein each record of the first subset of records is formed prior to a selected time and each record of the second subset of records is formed after the selected time.

Example 36 includes the subject matter of any of examples 21-35 (or any other example described herein), wherein the difference comprises a delta of first call stack(s) and second call stack(s), the first call stack(s) associated with the first subset of the records and the second call stack(s) associated with the second record.

Example 37 includes the subject matter of any of examples 21-36 (or any other example described herein), wherein the operations further comprise storing ranking information for a plurality of change paths, the plurality of change paths including the change path of the difference and change paths of previously identified differences.

Example 38 is a method, comprising: incrementally changing a first data structure as threads are established and completed by an application of a computing system, wherein the first data structure comprises first information of currently active threads; incrementally changing a second different data structure responsive to a portion of changes of the first data structure, wherein the second data structure correlates second information that is different than the first information to the currently active threads; identifying a plurality of times; at each selected time, synchronously extracting content from the first and second data structures for a selected thread and concatenate the extracted content to form a record for the selected thread; and storing the records in an electronic memory.

Example 39 includes the subject matter of example 38 (or any other example described herein), wherein the electronic memory comprises a local resource to be utilized by the application of the database, and the method further comprises: storing the records in a first data store of the local resource of the computing system; identifying a portion of content of the first data store; attempting to persist the portion of the content to a second data store of at least one of a different local resource of the computing system or a remote resource of a remote computing system; and removing the portion of the content of the first data store responsive to persisting the portion of the content to the second data store.

Example 40 includes the subject matter of any of examples 38-39 (or any other example described herein), further comprising: filtering the records based on a first plurality of criteria, wherein the plurality of criteria includes: a selected value that corresponds to the second information; and a first time range; identifying a first subset of the records responsive to the filtering based on the first plurality of criteria; filtering the records based on a second plurality of criteria, wherein the second plurality of criteria includes; said selected value; and a second time range that is different than the first time range; identifying a second subset of the records responsive to the filtering based on the first plurality of criteria; and determining whether to create a bug report based on a difference between the first and second subsets.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

Additionally, while the disclosed examples are often described herein with reference to an implementation in which an on-demand database service environment is implemented in a database system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computing system, comprising:
   a processing system; and
   a non-transitory memory device coupled to the processing system and including instructions stored thereon that, in response to execution by the processing system, are operable to perform operations including:
   fetching, from a first data source, first thread metadata information of threads of one or more applications of the computing system, the first thread metadata information includes one or more fields;
   incrementally changing a first data structure to include at least a portion of the fetched first thread metadata information as the threads of the one or more applications are established and completed;
   fetching, from a second data source separate and distinct from the first data source, second thread metadata information of the threads, the second thread metadata information includes one or more fields and is correlated with and is different than the first thread metadata information for the threads;
   incrementally changing a second data structure different than the first data structure responsive to a portion of the incremental changes of the first data structure to include at least a portion of the second thread metadata information;

wherein the first data structure includes first thread metadata information and the second data structure includes second thread metadata information for a specific one of the threads;

selecting the specific one of the threads at a selected instant;

synchronously extracting content from the one or more fields from the first thread metadata information of the first data structure and the one or more fields from the second thread metadata information of the second data structure of the selected one of the threads; and forming a record of the selected one of the threads by concatenating the extracted content.

2. The computing system of claim 1, wherein the first thread metadata information comprises a thread identifier value, a thread name value, and a thread state value.

3. The computing system of claim 2, wherein the second thread metadata information comprises thread context.

4. The computing system of claim 2, wherein the second thread metadata information comprises at least one of user name value or a tenant identifier value.

5. The computing system of claim 1, wherein the first data structure and second data structure comprise first and second maps, respectively, each map indexed by a thread identifier.

6. The computing system of claim 1, wherein the record includes third metadata information.

7. The computing system of claim 6, wherein the third metadata information comprises a time stamp.

8. The computing system of claim 6, wherein the third metadata information comprises a call stack for the selected thread.

9. The computing system of claim 1, wherein at least one of the threads is created responsive to a request received by the computing system.

10. The computing system of claim 9, wherein the request comprises at least one of a request of an internal service of the computing system or a HTTP (hypertext transfer protocol) request of a browser of a client device.

11. The computing system of claim 1, wherein the operations further comprise identifying an application specific context and extracting the content from the second data structure based on the application specific context.

12. The computing system of claim 11, wherein identifying the application specific context further comprises selecting a thread context mapper of a plurality of thread context mappers.

13. A method, comprising:

fetching, from a first data source, first thread metadata information of threads of one or more applications of the computing system, the first thread metadata information includes one or more fields;

incrementally changing a first data structure to include at least a portion of the fetched first thread metadata information as the threads of the one or more applications of a computing system are established and completed;

fetching, from a second data source separate and distinct from the first data source, second thread metadata information of the threads, the second thread metadata information includes one or more fields and is correlated with and is different than the first thread metadata information for the threads;

incrementally changing a second data structure different than the first data structure responsive to a portion of the incremental changes of the first data structure to include at least a portion of the second thread metadata information;

wherein the first data structure includes first thread metadata information and the second data structure includes second thread metadata information for a specific one of the threads;

selecting the specific one of the threads at a selected instant;

synchronously extracting content from the one or more fields from the first thread metadata information of the first data structure and the one or more fields from the second thread metadata information of the second data structure of the selected one of the threads; and forming a record of the selected one of the threads by concatenating the extracted content.

14. The method of claim 13, wherein the first thread metadata information comprises a thread identifier value, a thread name value, and a thread state value.

15. The method of claim 13, wherein the second thread metadata information comprises thread context.

16. The method of claim 13, wherein the first data structure and the second data structure comprise first and second maps, respectively, each map indexed by thread identifier.

17. The method of claim 13, wherein the record includes third metadata information.

18. The method of claim 17, wherein the third metadata information comprises a call stack for the selected thread.

19. The method of claim 13, further comprising identifying an application specific context and extracting the content from the second data structure based on the application specific context.

20. The method of claim 19, wherein identifying the application specific context further comprises selecting a thread context mapper of a plurality of thread context mappers.

* * * * *